March 26, 1929.  P. E. BRENEMAN  1,706,649
BODY CONSTRUCTION
Filed March 17, 1926    7 Sheets-Sheet 2

INVENTOR
PAUL E. BRENEMAN.
BY
ATTORNEY

March 26, 1929.   P. E. BRENEMAN   1,706,649
BODY CONSTRUCTION
Filed March 17, 1926   7 Sheets-Sheet 4

INVENTOR
PAUL. E. BRENEMAN
BY
ATTORNEY

March 26, 1929.　　P. E. BRENEMAN　　1,706,649
BODY CONSTRUCTION
Filed March 17, 1926　　7 Sheets-Sheet 5

INVENTOR
PAUL E. BRENEMAN
BY
ATTORNEY

Patented Mar. 26, 1929.

1,706,649

UNITED STATES PATENT OFFICE.

PAUL E. BRENEMAN, OF DETROIT, MICHIGAN, ASSIGNOR TO THE STUDEBAKER CORPORATION, OF SOUTH BEND, INDIANA, A CORPORATION OF NEW JERSEY.

BODY CONSTRUCTION.

Application filed March 17, 1926. Serial No. 95,317.

This invention relates to vehicle bodies, and particularly to doors of the type employed in closed automobile body constructions, and the principal object is to provide a new and novel construction for a door of the type described which will be fabricated from sheet metal, thereby resulting in a door of light but strong construction, and one that may be produced in quantities at a substantially lower price than the composite wood-and-metal doors now generally in use.

Another object is to provide a door which, while being constructed of sheet metal, will retain the same substantial appearance and advantages of the conventional composite wood-and-metal doors now in use, and in addition will eliminate the disadvantage thereof.

Another object is to provide a door of the type described which will be provided with a window frame formed therewith, the construction being such as to especially lend itself to forming the entire face of the door and window frame from a single stamping.

A further object is to provide a sheet metal door having a window frame in which the entire face of the door and window frame may be made from a single stamping, certain other members being applied thereto and acting both as reinforcing and exterior main forming parts of the door itself Another object is to provide a framed sheet metal door, the face of which comprises a single stamping, to the edges of which are secured other stampings forming the edges of the door and reinforcements therefor.

Another object is to provide a framed door, the face of which comprises a single stamping, or a plurality of stampings joined to form a single piece, together with reinforcing edge members presenting a rabbeted door edge and provided with an outwardly extending edge flange parallel to the face of the door over which the marginal edges of the face are bent to secure the same thereto.

Another object is to provide a sheet metal door comprising a unitary facing member or panel having a window opening formed therein, the interior edges of the metal forming the opening being bent inwardly away from the face of the door and the side edges thereof then bent outwardly parallel to the face of the door to form a window channel abutment, and then inwardly away from the face of the door in a plane perpendicular thereto; a combined rabbeted door edge and reinforcing member having an outwardly extending marginal flanged edge which is secured to the marginal edge of the facing member or panel by bending the marginal edge of the facing member or panel thereover, and having an inwardly projecting flange perpendicular to the face of the door, preferably bent back on itself for strength and appearance, to which the last mentioned inwardly projecting flange on the facing member or panel is secured by welding, screws or the like.

Another object is to bend the inwardly turned edge of the facing member or panel at the bottom of the window opening back on itself and then downwardly to form a support for a weatherstrip adapted to contact with the forward face of the window which is received in the door.

Another object is to provide a combined upper door edge and reinforcement member comprising a horizontal body having an upwardly disposed marginal forward flange over which the upper edge of the facing member or panel is bent, a door check arm retaining slot being formed in the body of said member.

Another object is to provide the rear edge of the combined edge and reinforcing member, below the plane of the window opening, with an inwardly turned flange parallel to the plane of the facing member in order to provide suitable means for securing transverse door reinforcing members in place and for supporting the lock board.

Another object is to provide a door as described with an opening in the upper window frame member thereof immediately adjacent to the window channel abutment portion of the side members, through which opening a window channel may be passed, and to provide a window channel socket secured to the side members below the plane of the window opening for receiving the lower end of the window channel.

A further object is to provide a door as described in which the means for securing the garnish moldings around the window openings is not evident on the face of such molding.

The above being among the objects of the present invention, the same consists of certain novel features of construction and combination of parts to be hereinafter described with reference to the accompanying drawings, and then claimed, having the above and other objects in view.

In the accompanying drawings which illustrate a suitable embodiment of the present invention, and in which like numerals refer to like parts throughout the several different views—

Fig. 1 is a perspective view from the back of what I prefer to call the facing member of the door, it being the main member of the door itself which, when suitably reinforced as later described, goes to make up the complete door.

Fig. 1$^a$ is a sectional view of the edge portion of the facing member as on the line 1$^a$—1$^a$ of Fig. 1.

Fig. 1$^b$ is a sectional view of the window frame side member as on the line 1$^b$—1$^b$ of Fig. 1.

Fig. 1$^c$ is a sectional view of the window frame top member taken on the line 1$^c$—1$^c$ of Fig. 1.

Fig. 1$^d$ is a sectional view taken through the window frame on the line 1$^d$—1$^d$ of Fig. 1.

Fig. 1$^e$ is a sectional view taken through the point where the frame side members join the main body of the door facing member or panel as on the line 1$^e$—1$^e$ of Fig. 1.

Fig. 1$^f$ is a vertical sectional view taken through a portion of the main facing member or panel immediately below the window opening as on the line 1$^f$—1$^f$ of Fig. 1.

Fig. 1$^h$ is a vertical sectional view taken through the lower edge portion of the main facing member or panel as on the line 1$^h$—1$^h$ of Fig. 1.

Fig. 4$^a$ is an enlarged perspective view of the member shown in Fig. 4, showing more clearly the form of the door check arm receiving slot formed therein.

Fig. 5 is a perspective view of the main facing member or panel shown in Fig. 1 with all the reinforcing members, including those shown in Figures 2, 3 and 4, secured thereto in finished relation therewith.

Fig. 5$^a$ is a sectional view taken as on the line 5$^a$—5$^a$ of Fig. 5.

Fig. 5$^b$ is a sectional view taken on the line 5$^b$—5$^b$ of Fig. 5.

Fig. 5$^c$ is a sectional view taken on the line 5$^c$—5$^c$ of Fig. 5.

Fig. 5$^d$ is a sectional view through the slanting cross-reinforcing members taken as on the line 5$^d$—5$^d$ of Fig. 5.

Fig. 5$^e$ is a sectional view through the horizontally disposed cross-reinforcing member taken on the line 5$^e$—5$^e$ of Fig. 5.

Fig. 5$^f$ is a sectional view taken vertically through the lower portion of the door facing member or panel and its reinforcing member as on the line 5$^f$—5$^f$ of Fig. 5.

Fig. 5$^g$ is a vertical sectional view taken on the line through that portion of the door immediately below the window opening as on the line 5$^g$—5$^g$ of Fig. 5, and corresponding to the view shown in Fig. 1$^f$, showing the weather strip or seal assembled thereto.

Fig. 5$^h$ is a perspective view of one of the lower corner reinforcing members.

Fig. 5$^i$ is a perspective view of one of the reinforcing members which are secured to the door at the point where the window frame joins the main body portion.

Fig. 6$^a$ is a sectional view of the lock board taken on the line 6$^a$—6$^a$ of Fig. 6.

Fig. 6$^b$ is a sectional view of the lock board taken on the line 6$^b$—6$^b$ of Fig. 6.

Fig. 6$^c$ is a sectional view of the lock board taken on the line 6$^c$—6$^c$ of Fig. 6.

Fig. 12 is a fragmentary perspective view corresponding to Fig. 8, showing the side window garnish molding assembled in position against the window glass channel, the upper garnish molding not being shown.

Fig. 12ª is a fragmentary perspective view of the side garnish molding in the same relative position as shown assembled to the door in Fig. 12.

Fig. 12ᵇ is a perspective view of the garnish molding shown in Fig. 12ª turned over to show the securing means provided on its back face.

Fig. 12ᶜ is a fragmentary perspective transverse sectional view taken through the door side window frame member, glass channel and garnish molding of Fig. 12.

Fig. 12ᵈ is a perspective sectional view corresponding to the view in Fig. 12ᶜ, but looking from the other side, showing the method of securing the garnish molding in position.

Fig. 13ª is an enlarged fragmentary perspective sectional view taken through one of the rubber blocks and cross-reinforcing member of Fig. 13, more clearly showing the construction of the same.

Fig. 14ª is a perspective view of the door hinge, part of which is shown secured to the window side frame in Fig. 14.

Figures 1, 1A, 1B, 1C, 1D, 1E, 1F, 1H:
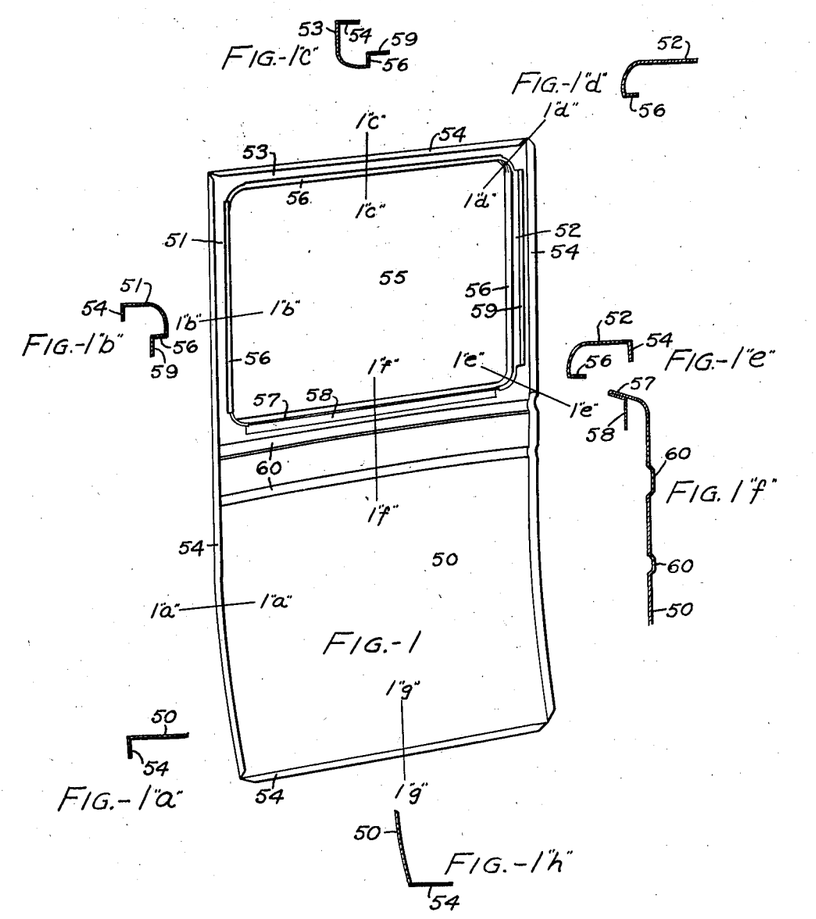

In Fig. 1 is shown the main facing member or panel in condition ready to receive the various reinforcing and other members which, when combined therewith go to make up the completed door. This main panel comprises a main body or door portion 50 and a window frame portion comprising side portions 51 and 52 and top portion 53. The whole panel including the portions 51, 52 and 53 is preferably formed from a single sheet metal stamping, although the portions 51, 52 and 53 may be made up separately from one or more individual stampings and secured thereafter to the main body portion 50 by suitable means, and in the following description, although the construction of the door will be described considering the panel to be made from a single stamping, it will be borne in mind that the present invention is not limited to the same but may be made up from a plurality of parts as described which is within the province of an ordinarily skilled workman in this class of work.

The face of the panel may be flat or curved as best suits the shape and contour of the vehicle body to which it is to be adapted. In forming, its entire marginal edge 54 is bent away from its normally outward or exposed face and substantially perpendicular thereto as shown in Figures 1ª, 1ᵇ, 1ᶜ and 1ᵉ, for a purpose to be described later. The edge of the metal surrounding the opening 55, which opening has been formed in the panel to provide a window opening, is curved towards the center of the opening and away from the face of the panel to provide a rounded edge for the face of such opening as indicated in Figures 1ᵇ, 1ᶜ, 1ᵈ, 1ᵉ and 1ᶠ, and the extreme inner edge of the metal of the side portions 51 and 52, and the top portion 53, at a point where a tangent to such rounded face would be perpendicular to the face of the panel, is then bent outwardly or away from the center of the opening to form a face or abutment 56 lying parallel to the face of the panel as shown in Figures 1ᵇ, 1ᶜ, 1ᵈ and 1ᵉ. The corresponding edge at the bottom of the opening 55 is bent back on itself as at 57 and then downwardly parallel to the face of the panel (see Fig. 1ᶠ) to form a supporting flange 58 for a purpose to be described later.

The marginal edge of the face or abutment 56 is bent inwardly away from the face of the panel to form a flange 59 as shown in Figures 1ᵇ and 1ᶜ. If desired, outwardly projecting beads such as 60 may be formed in the panel, as shown in Figures 1 and 1ᶠ, to line up with like beads or molding on the sides of the vehicle body to which the door is to be attached, to give a panel effect to the same and which, incidentally has the effect of stiffening the same.

Figure 2:
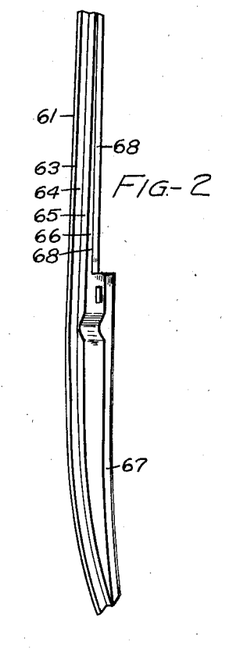
Fig. 2 is a perspective view of the combined door edge and reinforcing member which is secured to the latch side of the main facing member or panel shown in Fig. 1.
Figure 3:
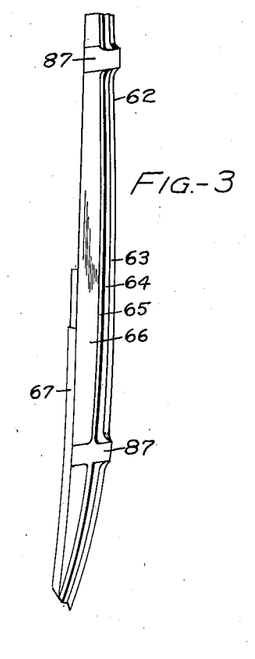
Fig. 3 is a perspective view of the combined door edge and reinforcing member which is secured to the hinge side of the main facing member or panel shown in Fig. 1.
Figures 5, 5A, 5G:
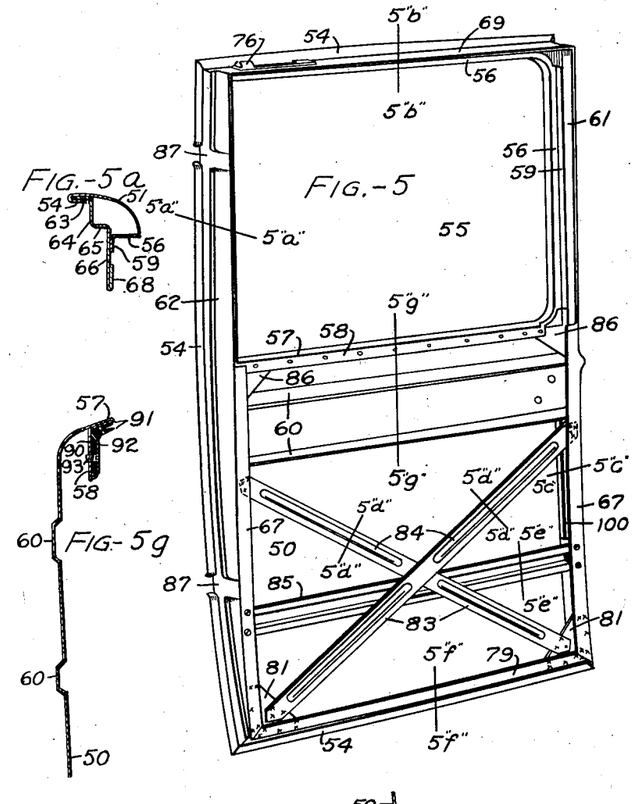
Figure 5B:
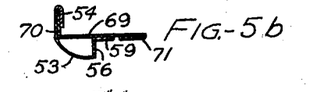
Figure 5C:
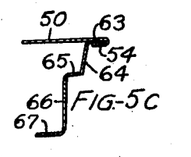
Figure 5D:
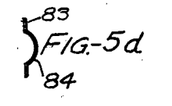
Figure 5E:
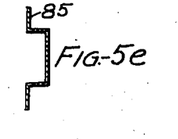
Figure 5F:
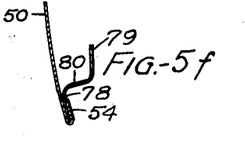
Figure 5H:
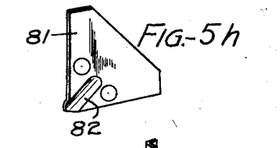
Figure 5I:
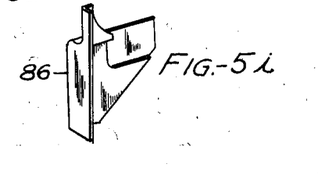

Referring now to Sheets 2 and 3 of the drawings which illustrate several reinforcing members which, when applied to the panel as shown in Fig. 1, go to make up the complete body of the door as shown in Fig. 5, Fig. 2 illustrates the combined door edge and reinforcing member 61, as seen from the normally unexposed side thereof, which is applied to the latch edge of the panel shown in Fig. 1, and Fig. 3 illustrates the similar combined door edge and reinforcing member 62, as seen from the exposed side thereof, which is applied to the hinge edge of the panel shown in Fig. 1. The members 61 and 62 are each formed from a single sheet metal stamping to the same length as the door and to the same contour as the vertical edge of the door to which it is attached. Each member 61 and 62 with minor differences as will hereafter be described, are of the same section, except in reversed position as will readily be understood, and each is provided with an outwardly extending marginal flange 63 lying parallel to the face of the panel, the member extending inwardly therefrom away from the face of the panel a short distance to form an edge face 64 and then being bent inwardly towards the center of the door to form a step 65, from which step it continues away from the face of the panel to form a second edge face 66. Below the window opening 55 the margin of this last mentioned face 66 is bent inwardly towards the center of the door, thereby forming an attaching flange 67 to which various reinforcing members are secured as will later be described. Above the lower edge of the window opening 55 the margin of the face 66 is bent inwardly towards the center of the door and then back on itself as at 68 to give a finished appearance to the edge and to add strength thereto. The members 61 and 62 are applied to the panel by placing them against the rear side thereof with the marginal flanged edge 63 parallel to the face of the panel and lying flat against the rear face thereof with the edge of the flange 63 abutting against the flange 54 of the panel, which flange 54 is then bent back on itself over the flange 63, as particularly well shown in Figures 5$^a$, 5$^b$, 12$^c$ and 12$^d$, and then the flanges 54 and 63 are preferably spot welded together. When these flanges 54 and 63 are positioned as just described, the relation of the members 61 and 62 to the panel is such that the flanges 59 formed at the inner edges of the window frame portions 51 and 52 abut and lie flat against the inside face of the side face portions 66 of the members 61 and 62, preferably short of the reversely bent edge portion 68 thereof, and these parts are then welded or otherwise secured together in this position. It will readily be seen that the portions 51 and 52 of the panel combined with the side members 61 and 62 thus form a hollow structure of light but strong construction well adapted to resist the severe strains to which this part of a door is subjected.

Figure 4:
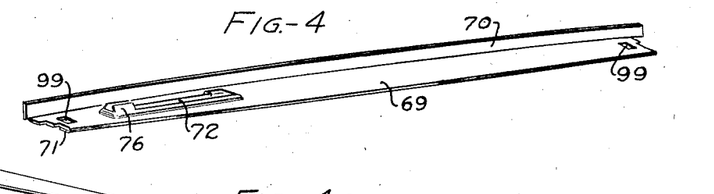
Fig. 4 is a perspective view of the door window frame upper reinforcing member.
Figure 4A:
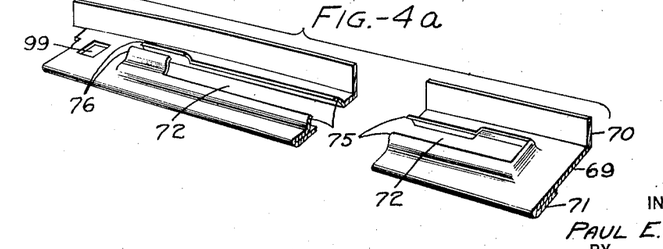
Figure 7:
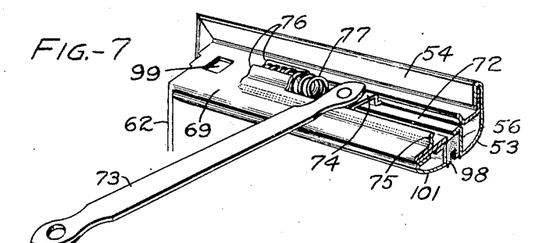
Fig. 7 is a fragmentary perspective sectional view of the upper door frame member showing the door check arm in complete assembled position in relation thereto.

The top edge of the door is provided with a combined edge and reinforcing member, as illustrated in Figures 4 and 4$^a$, comprising a flat plate 69 having its outer marginal edge bent up to provide a marginal flange 70, and having its inner marginal edge bent down and back on itself as at 71 to stiffen the same. The flange 70 is placed against the rear face of the upper window frame portion 53 of the panel with its upper edge against the flange 54 which is then bent back over the flange 70 and secured thereto in exactly the same manner that the flanges 54 and 63 are secured together on the sides as previously described. When these parts are thus secured together, the inner flange 59 on the upper frame portion 53 abuts against the under side of and is secured to the member 70 in the same manner as the flanges 59 on the sides of the panel are secured to the members 61 and 62 as previously described. The upper ends of the side members 61 and 62 are then preferably welded to the ends of the member 69, thus giving added strength to the whole construction. If desired, the member 69 may be provided with a slot such as 72 (see Figures 4 and 4$^a$) for receiving the end of a door check arm such as 73, shown in Fig. 7. The end of the check arm 73 is provided with an end member 74 pivoted thereto which is guided in the slot 72 and bears against the under sides of the metal surrounding the slot, which metal, in order to provide clearance for the end 74, is upwardly bent as at 75 in Figures 4$^a$ and 7. As also shown more clearly in Fig. 4$^a$, the end of the slot farthest from the hinge edge of the door is enlarged to allow the end 74 to be inserted therein, and the walls of the opposite end of the slot are provided with a pair of upstanding fingers 76 which are adapted to embrace and hold a coil spring 77, as shown in Fig. 7, which provides a resilient stop for the end 74 when the door is swung to its extreme open position.

The lower edge of the panel is provided with a combined edge and reinforcing member of Z-shaped section having vertically disposed parallel marginal flange portions 78 and 79 and a horizontally disposed connecting portion 80, best shown in Fig. 5$^t$. The flange 78 is placed flat against the inside surface of the panel with its free edge abutting against the flange 54 at the bottom edge of the panel, and the flange 54 is then bent over it and secured thereto in the same manner as the flanges 54 on the sides of the panel are bent over and secured to the flanges 63 on the side members 61 and 62. The ends of this Z-sectioned member are then welded or otherwise secured to the lower ends of the side members 61 and 62. To further strengthen the joint between the side members 61 and 62 and the bottom member just described, triangular shaped plates such as 81 (an enlarged perspective view of the one for the lower left-hand corner of the door as viewed in Fig. 5 being shown in Fig. 5$^h$) are placed against the inside faces of the flanges 67 and 79 at the joint and are welded or otherwise secured to said flanges. As shown in Fig. 5$^h$, a depression 82 is preferably formed in the plate 81 immediately over the joint to clear the metal deposited at that point in the process of welding the same. The plates 81 also serve as attaching flanges for the brace members 83 which are welded or otherwise secured thereto and which extend upwardly therefrom at an angle, to the opposite side of the door and are welded to the inner face of the flanges 67 on the rear of the side members 61 and 62, as well as being secured together at the point where they cross each other. These brace members 83, which are formed of sheet metal and are provided with a bead 84 to impart stiffness thereto, as indicated in section in Fig. 5$^d$, act to stiffen the lower portion of the door and impart strength thereto without preventing access to the interior of the door. Another member 85 of U shaped section with outwardly flanged edges as shown in section in Fig. 5ᵉ extends horizontally across the door and is welded to the inner faces of the flanges 67, thereby acting as an additional stiffening member and serving in an additional capacity as described later. The member 85 is also preferably welded to the braces 83 at the points where it crosses the same for preventing possible rattling and for tying the same together to increase the stiffness of the door. Another reinforcing member 86, of the shape shown in perspective in Fig. 5ᶠ, is secured between the upper end of the flanges 67 of the side members 61 and 62 and the downwardly directed supporting flange 58 at the lower edge of the window opening 55, thereby imparting added strength and rigidity to the door at this point.

Figure 6:
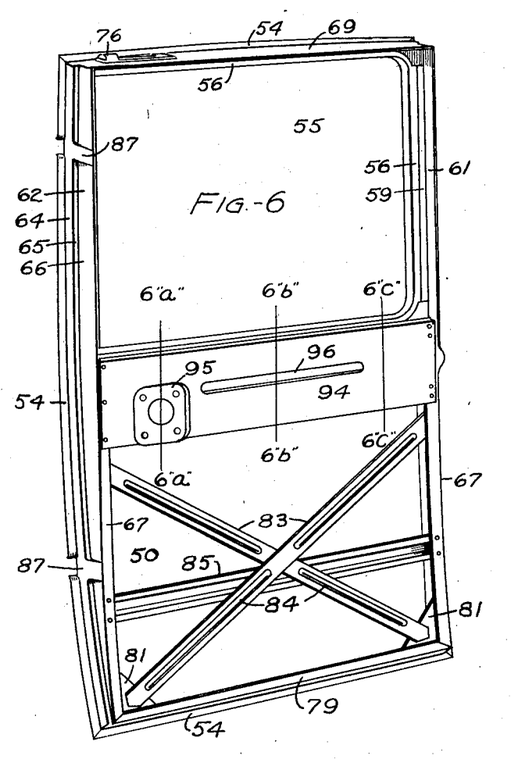
Fig. 6 is a perspective view corresponding with the view in Fig. 5, but showing the lock board secured thereto.
Figure 6A:
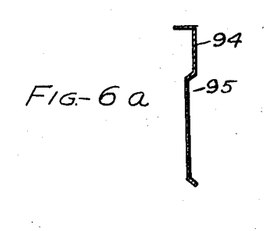
Figure 6B:
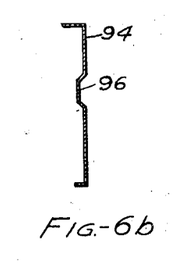
Figure 6C:
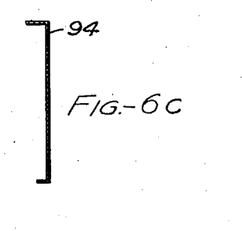

In the outside face of the member 62, which constitutes the hinge edge of the completed door, transverse depressions such as 87, as shown in Figures 3, 5 and 6, are formed to provide a seat for the door hinge half 88. The metal bounding the depressions 87 is preferably formed to provide an abutment for the upper and lower edges of the hinge half 88 which is secured therein by riveting it or welding it, or both, to the member 62. Although only sufficient depressions 87 are shown in the drawings in the member 62 to accommodate two hinges, it is evident that as many may be provided as is thought necessary. The other half 89 of the door hinge, shown assembled to the half 88 in Fig. 14ᵃ, may be secured to the body pillar (not shown) in any suitable manner.

Referring now to Figures 5 and 5ᵍ, it will be seen in Fig. 5ᵍ that a resilient member 90 having two divergent angularly disposed tongues 91 is secured to the supporting flange 58 by a metal strip 92 and screws 93, with the upper tongue 91 abutting against the reversely bent portion 57 and extending towards the inside face of the door therefrom. The purpose of this resilient member 90 is to seal the space between the window (not shown) which is adapted to be received by the door, and the reversely bent portion 57, when the window is in closed position, thereby preventing the entrance of rain, water or the like to the interior of the door.

The door in the state of completion shown in Fig. 5 is further completed as shown in Fig. 6 by the addition of what is commonly known as the lock board indicated by the number 94. This board 94 is preferably of flanged sheet metal and extends transversely across the inner face of the door immediately below the window opening 55 and is adapted to support, if desired, the window regulator (not shown) door latch, (not shown) or any other mechanism found desirable. Such parts are preferably assembled to the board 94 before assembly to the door, so that all may be assembled to the door as a unit, and for this reason the board 94 is screwed to the flanges 67 instead of being welded thereto, as well as to permit removal thereof to gain access to the different mechanisms supported thereby. In order to facilitate assemblage of such parts to the board 94, depressions such as 95 (Figures 6 and 6ᵃ) are formed in the board to locate such parts thereon, and to provide a better seat therefor. Depressions such as 96 (Figures 6 and 6ᵇ) may also be formed in the board 94 to impart strength and stiffness thereto.

Figures 8, 9, 10, 11:
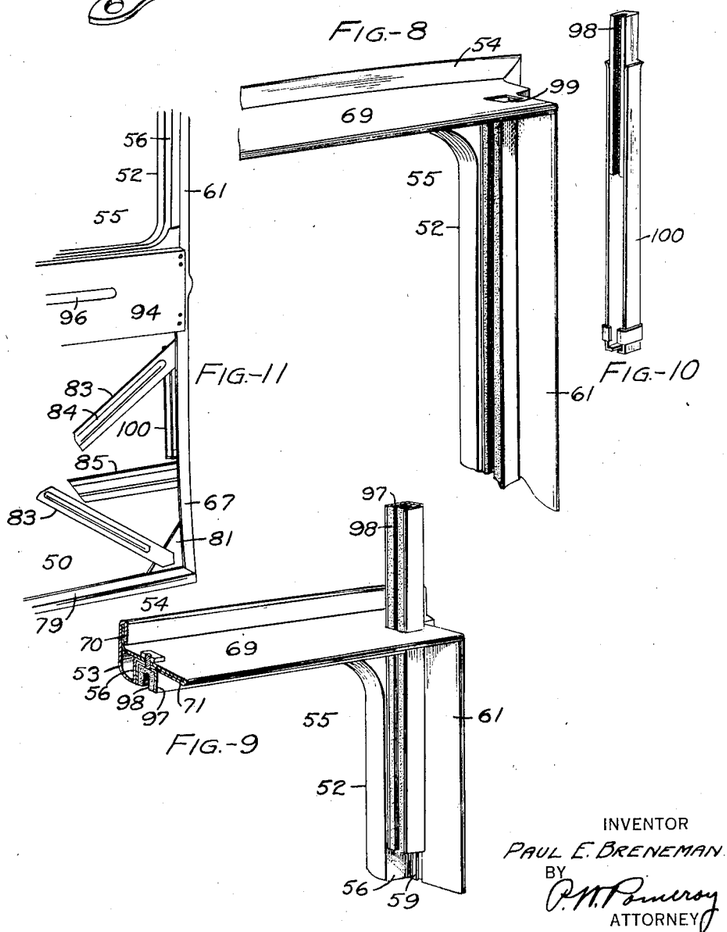
Fig. 8 is a fragmentary perspective view of an upper corner of the door window frame showing the position of the window glass channel in relation thereto.
Fig. 9 is a view corresponding to Fig. 8 but showing the method of inserting the window glass channel in the door through the opening in the upper frame member.
Fig. 10 is a perspective view of the socket provided for receiving the lower end of the window glass channel, a fragment of the channel being shown inserted therein.
Fig. 11 is a fragmentary perspective view of the door showing the position in which the socket member shown in Fig. 10 is secured thereto.

The window which the door of the present invention is adapted to receive, and which is not shown in the drawings, is preferably of the conventional type now in use which comprises a sheet of unframed plate glass, to the lower edge of which is attached a channel and bracket for connection with the window regulator (not shown). Felt or felt lined channels are provided in such constructions for guiding the side edges of the glass. These channels are usually nailed to the wooden side members of the conventional composite doors now in use as previously described. In the present invention, as shown best in Figures 12ᶜ and 12ᵈ, the channels provided for the edges of the windows comprise a U sectioned thin metallic member 97 in which is received a U shaped felt member 98 within which the edges of the window glass are adapted to be slidably received. In the present invention novel means are provided for inserting and holding these channels as follows. In order to insert them in the door, openings 99 are formed in the door upper reinforcing member 69 in axial alignment with their assembled position, so that the channels may be passed downwardly therethrough as indicated in Fig. 9. The lower ends of the channels, when in assembled position, are received in and held by socket members 100, shown in enlarged perspective in Fig. 10. The sockets 100 are of sheet metal and are secured in proper position to the face portions 66 of the side members 61 and 62 as best shown in Figures 5 and 11, by welding, riveting or the like. When in such assembled position, the channels lie against the face or abutment 56 formed in the edges of the window frame side portions 51 and 52 at the sides of the window opening 55 previously described, and may be held from axial movement by one or more screws passed therethrough and threaded into the side members 61 and 62.

Figures 12, 12A, 12B, 12C:
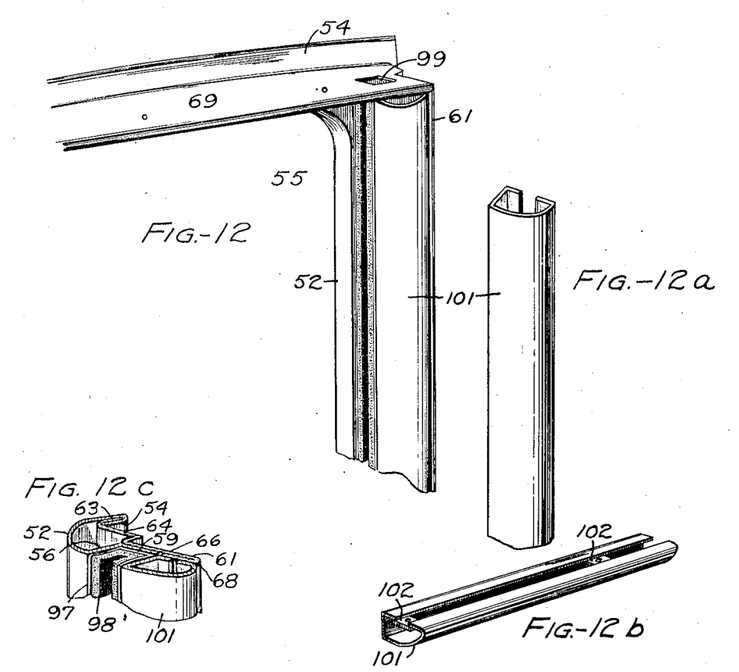
Figure 12D:
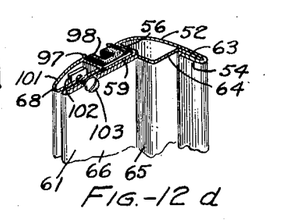

Garnish moldings 101, formed to the shape shown in various views on Sheets 5 and 6 of the drawings, are then applied to the members 61 and 62 in abutting relation to the window channels. These garnish moldings are made from single strips of sheet metal formed to the shape shown, but may be of any desired shape, the edges of the metal being bent around into spaced but adjacent relationship on the back or normally concealed face, and are tied together by nuts 102 welded to the metal within the molding across the space between the edges, as shown in Fig. 12$^b$. The molding 101 is held in assembled position by screws such as 103 which are passed through the face portions 66 of the side members 61 and 62, from the outside faces thereof, and are threaded into the nuts 102 as best shown in Fig. 12$^d$, thereby holding the molding securely in position. It will be evident that by such a construction, the means for holding the moldings 101 to the door are entirely concealed when the door is shut, thereby providing a much more finished appearance than is possible with the conventional moldings which are secured in place by screws passing through their exposed faces. The upper edge of the door is provided with a channel and molding in the same manner as the channels and moldings are provided for the sides, as shown in Figures 7 and 9.

Figure 13:
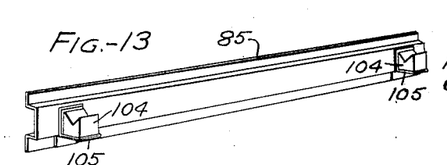
Fig. 13 is a perspective view of the horizontally disposed cross-reinforcing member, showing the rubber blocks for receiving the lower edge of the window glass when in lowered position, secured thereto.
Figure 13A:
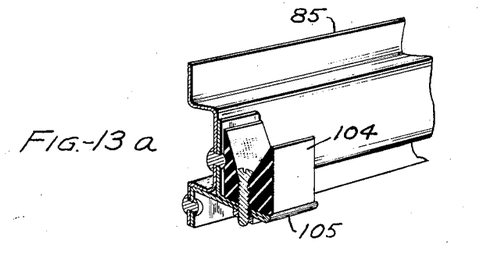
Figure 14:
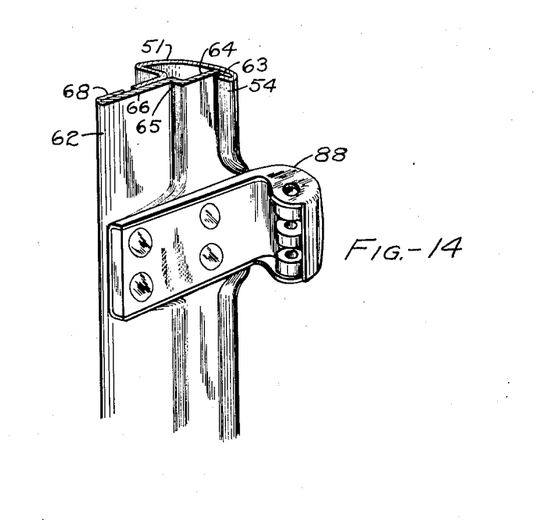
Fig. 14 is a fragmentary perspective view of one of the window frame side members showing part of the door hinge secured thereto.
Figure 14A:
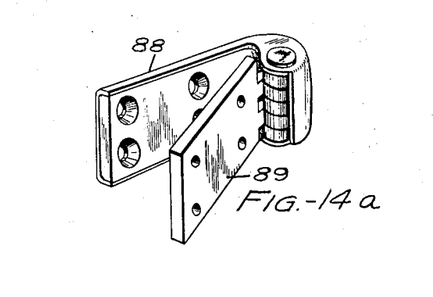

In order to provide a support for the lower edge of the window when in lowered position, grooved rubber blocks 104 supported by and secured to sheet metal brackets 105 which in turn are secured to the transverse brace member 85 are provided as shown in Figures 13 and 13$^a$, the lower edge of the window being adapted to be received in the groove of the blocks.

From the foregoing description, the construction of my improved door will be readily understood and it is within the province of the ordinary mechanic skilled in this art to make formal changes in the specific embodiment of the invention described without departing from the spirit and substance of the broad invention, the scope of which is commensurate with the appended claims.

What I claim is:—

1. A door comprising a unitary sheet metal face member, stepped side edge members and an L-shaped top member provided with marginal flanges secured to the margin of said face member, a window opening in said face member the metal about which is bent inwardly away from the face of said face member and then away from said opening in the plane thereof and terminating in marginal flanges secured to said side and L-shaped top members, the metal of said face member at the lower edge of said window opening being bent inwardly away from the face of said face member and then bent reversely back on itself to form a horizontally disposed abutment and then downwardly to form an attaching flange.

2. A metal door having a sheet metal face member provided with a window opening, the metal of said face member at the lower edge of said opening being bent inwardly away from the face of said member and then downwardly and back on itself to form a horizontally disposed abutment terminating in a vertically disposed attaching flange, and a resilient weather strip secured to said flange in abutting relation with said abutment.

3. A door comprising a unitary sheet metal face member provided with a window opening and stepped sheet metal side members provided with marginal flanges at the outer edge thereof secured to the margin of said face member by bending the margin thereof over said flanges, the inner edge of said side members in the region of said window opening being disposed perpendicularly to the plane of said face member and bent back on itself to form a window garnish moulding support, and the inner edge of said side members below the region of said window opening being bent parallel to the plane of said face member to form attaching flanges for reinforcing members.

4. A door comprising a sheet metal face member provided with a window opening and sheet metal side members provided with outwardly extending marginal flanges secured to the margin of said face member, the inner edge of said side members in the region of opening being disposed in a plane perpendicular to the plane of said face member and below said window opening in a plane parallel to the plane of said face member, and a lock board extending transversely of said door below said window opening and secured to the last mentioned flanges.

5. A door comprising a unitary sheet metal face member provided with a window opening and sheet metal side members secured to the margins thereof in generally perpendicular relation thereto, the inner margins of said side members below said window opening being bent towards each other in a plane parallel to the face of said member, a reinforcing member extending between and secured to said flanges, and means supported on said reinforcing member for receiving the lower edge of a window.

6. In a door provided with sheet metal edges and a window opening, sockets secured to the side edges of said door below said opening for receiving window guiding channels, the top edge of said door having openings therein for allowing said channels to be inserted in said sockets.

7. A door having a unitary sheet metal face member provided with a window opening therein, sheet metal edge members secured perpendicularly to the margin of said face member, the metal of said face member defining the side edges of said opening being bent away from the plane of said face member and then outwardly in the plane of said opening to form a window guiding channel abutment, and a window guiding channel receiving socket secured to the side edge members below said opening and in line with said abutment.

8. A door having a unitary sheet metal face member provided with a window opening and sheet metal edge members at the top and sides thereof perpendicularly disposed in relation thereto and secured along the margin thereof, the metal of said face member defining the side edges of said opening bent to form window channel abutments parallel to the plane of said face member, sockets for receiving window channels secured to the side edge members below said opening, the top edge member having openings therein conforming in shape to said channels in line with said abutments to permit insertion of said window channels into said sockets.

9. In an automobile door, a garnish moulding comprising a single strip of metal having edges reversely bent into adjacent relationship to form the normally unexposed face thereof, and screws not apparent from the exposed face thereof co-operating with said unexposed face for securing said moulding in position.

10. In an automobile door construction, a jamb rail of substantially double Z cross section extending substantially the full length of the door, the inner branch of said rail above the belt line of the door being folded back upon the web of said rail, a molding member overlying the inner surface of the folded back portion of said rail, and means for detachably securing said member in position.

11. In an automobile door construction, a pressed metal frame work including side and top rails, each of said rails including reversely bent portions along the inner edges thereof, a panel the side and top edges of which are clinched over the outer edges of said rails, said panel being provided in its upper portion with an opening, the sides and top of which are defined by inturned portions of the panel forming one side and the base walls of upper glass run channels, and a molding member detachably secured to said reversely bent portions of the side and top rails, said molding member constituting the opposite side walls of said glass run channels.

12. In a door for closed vehicle bodies, a pressed metal horizontal rail of web cross section having its inner edge turned back upon itself to form a guide for door stop mechanism.

13. A rail for doors of closed vehicle bodies comprising in the region of the window opening a main transversely extending portion of web cross section forming a jamb face of the door, and an outer door overlap flange, the main transversely extending portion being offset toward the central transverse plane of the door at its inner portion, a panel strip clinched around the overlap flange and extending inwardly of the door in bowed relation and then flanged, first toward the transversely extending web portion and then laterally and secured to said web portion inwardly of said offset therein, and a window retaining strip seated on the inner offset portion of the transversely extending web portion and detachably secured thereto.

14. A rail for doors of closed vehicle bodies comprising in the region of the window opening a main transversely extending portion of web cross section forming the jamb face of the door and offset toward the central transverse plane of the door at its inner portion and having the inner edge thereof folded back upon the web of said rail, a panel strip having an edge flange secured to the transversely extending web portion inwardly of said offset and forming the bottom of the glass run, a window retaining strip overlying the inner surface of the folded back portion of sail rail, and means for detachably securing said window retaining strip in position.

15. A rail for doors of closed vehicle bodies comprising in the region of the window opening a main transversely extending portion of web cross section forming a jamb face of the door, and an outer door overflap flange, the main transversely extending portion being offset toward the central transverse plane of the door at its inner portion and having the inner edge thereof folded back upon the web of said rail, a panel strip clinched around the overlap flange and extending inwardly of the door in bowed relation and then flanged, first toward the transversely extending web portion and then laterally and secured to said web portion inwardly of said offset therein, a window retaining strip overlying the inner surface of the folded back portion of said rail, and means for detachably securing said window retaining strip in position.

16. In an automobile door construction, a hinge rail extending substantially the full length of the door and of substantial Z cross section adjacent the window opening, the inner branch of said rail at said opening being reversely bent parallel to the web of said rail, a molding member overlying the inner surface of said reversely bent portion, and means for detachably securing said member in position.

17. In a door for closed vehicle bodies, a window frame comprising a rail having a main transversely extending body portion of web cross section, the inner edge thereof being reversely bent parallel to the web of said rail, and a door overlap flange at the outer edge of said web, a panel strip stamping secured along one edge of said overlap flange and having its other edge portion extending inwardly and provided with an angle shaped extremity, the arm of which forms a side and bottom of a glass receiving channel, and a molding member overlying the reversely bent portion of said web in spaced relation to the side of said glass receiving channel to form the other side of said channel.

18. An automobile door construction comprising a metal side rail having a transversely extending body portion of web cross section, and extending the full length of the door, a panel strip stamping secured at its one edge along an edge of said body portion and at its opposite edge intermediate the edges of said body portion, and a molding member secured to said body portion in spaced relation to said panel strip, said panel strip and molding forming a glass receiving channel.

Signed by me at Detroit, Michigan, U. S. A., this 12th day of March, 1926.

PAUL E. BRENEMAN.